United States Patent [19]

Takatsu et al.

[11] Patent Number: 5,152,920
[45] Date of Patent: Oct. 6, 1992

[54] PHENYLBICYCLOHEXANOL ESTER DERIVATIVE

[75] Inventors: Haruyoshi Takatsu; Kiyofumi Takeuchi, both of Tokyo; Yuji Tamura, Saitama, all of Japan

[73] Assignee: Dainippon Ink & Chemicals, Inc., Tokyo, Japan

[21] Appl. No.: 381,920

[22] Filed: Jul. 19, 1989

[30] Foreign Application Priority Data

Jul. 20, 1988 [JP] Japan .................................. 63-180694
Jul. 26, 1988 [JP] Japan .................................. 63-184526

[51] Int. Cl.$^5$ ...................... C09K 19/30; C07C 69/74; C07C 67/02
[52] U.S. Cl. ................................. 252/299.63; 560/1; 560/255
[58] Field of Search .................... 252/299.63, 299.06, 252/299.01; 560/1, 255

[56] References Cited

U.S. PATENT DOCUMENTS

| | | | |
|---|---|---|---|
| 4,398,803 | 8/1983 | Pohl et al. | 252/299.63 |
| 4,472,293 | 9/1984 | Sugimori et al. | 252/299.63 |
| 4,510,069 | 4/1985 | Eidenschink et al. | 252/299.63 |
| 4,548,731 | 10/1985 | Sugimori et al. | 252/299 |
| 4,620,938 | 11/1986 | Römer et al. | 252/299.63 |
| 4,808,333 | 2/1989 | Huynh-Ba et al. | 252/299.66 |
| 4,822,519 | 4/1989 | Saito et al. | 252/299 |
| 4,846,998 | 7/1989 | Pohl et al. | 252/299.63 |
| 4,877,547 | 10/1989 | Weber et al. | 252/299.61 |
| 4,886,621 | 12/1989 | Sage et al. | 252/299.61 |
| 4,908,152 | 3/1990 | Goto | 252/299.63 |
| 4,910,450 | 3/1990 | Tanaka et al. | 252/299.63 |
| 4,946,986 | 8/1990 | Tanaka et al. | 252/299.63 |

FOREIGN PATENT DOCUMENTS

| | | | |
|---|---|---|---|
| 103681 | 3/1984 | European Pat. Off. | 560/1 |
| 0209622 | 1/1987 | European Pat. Off. . | |
| 0258868 | 3/1988 | European Pat. Off. . | |
| 3317921 | 12/1983 | Fed. Rep. of Germany . | |

*Primary Examiner*—Robert L. Stoll
*Assistant Examiner*—Philip Tucker
*Attorney, Agent, or Firm*—Armstrong & Kubovcik

[57] ABSTRACT

A phenylbicyclohexanol ester derivatives which is a nematic liquid crystal compound having a weakly positive dielectric anisotropy is disclosed. This compound has a high N-I point and yet a low Δn value. When mixed with other nematic liquid crystal compound(s), it can give a liquid crystal display cell material having excellent visual properties and high-temperature driving properties.

12 Claims, No Drawings

PHENYLBICYCLOHEXANOL ESTER DERIVATIVE

FIELD OF THE INVENTION

This invention relates to a phenylbicyclohexyl ester derivative useful as an electrooptical display material.

BACKGROUND OF THE INVENTION

Typical examples of liquid crystal display cells include a field effect mode cell proposed by M. Schadt et al. (*APPLIED PHYSICS LETTERS*, 18, 127–128 (1971)), a dynamic scattering mode cell proposed by G. H. Heilmeier et al. (*PROCEEDING OF THE I.E.E.E.*, 56, 1162 –1171 (1968)) and a guest/host mode cell proposed by G. H. Heilmeier et al. (*APPLIED PHYSICS LETTERS*, 13, 91 (1968)) or D. L. White et al. (*JOURNAL OF APPLIED PHYSICS*, 45, 4718 (1974)).

Among these liquid crystal display cells, TN mode cells, which belong to the field effect mode cells, are majorly used at present. In the case of the TN mode cells, it is required to set the product of the optical anisotropy ($\Delta n$) of the liquid crystal material in the cell and the thickness (d; $\mu m$) of the cell to a definite value in order to achieve good cell appearance, as indicated by G. Bauer (Mol. Cryst. Iiq. Cryst., 63, 45 (1981)). A liquid crystal display cell used in practice has a $\Delta n \cdot d$ value of either 0.5, 1.0, 1.6 or 2.2. Generally speaking, the visual properties of a liquid crystal display cell can be improved by setting the $\Delta n \cdot d$ value to 0.5. On the other hand, the frontal contrast thereof can be improved by setting the $\Delta n \cdot d$ value to 1.0, 1.6 or 2.2. Therefore it is generally recommended to set the $\Delta n \cdot d$ value of a liquid crystal display cell to 0.5, when it is regarded as important to achieve excellent visual properties from any direction. On the other hand, the $\Delta n \cdot d$ value thereof may be preferably set to 1.0, 1.6 or 2.2 in order to obtain a clear frontal contrast.

On the other hand, the thickness of a liquid crystal layer in a practically used liquid crystal display cell is commonly set to a definite value within a limited range of 6 to 10 $\mu m$. Thus a liquid crysal material having a low $\Delta n$ value is required in order to set the $\Delta n \cdot d$ value to 0.5. In contrast thereto, a liquid crystal material having a high $\Delta n$ value is required in order to set the $\Delta n \cdot d$ value to 1.0, 1.6 or 2.2. Namely, either a liquid crystal material having a low $\Delta n$ value or one having a high $\Delta n$ value is required depending on the desired display properties.

On the other hand, most of practically available liquid crystal materials are prepared by mixing several or more components selected from among compounds showing a nematic phase at around room temperature and those showing a nematic phase at a temperature range higher than room temperature. Most of these mixed liquid crystals practically employed today are required to show a nematic phase over the whole temperature range of at least $-30°$ C. to $+65°$ C. Recent diversification of the application of liquid crystal display cells has brought about a demand for a liquid crystal material having a nematic liquid crystal temperature range enlarged toward the higher temperature. Thus it has been required to develop a nematic liquid crystal compound having a high nematic-to-isotropic (N-I) transition temperature.

However a nematic liquid crystal compound having a high N-I transition temperature frequently has a $\Delta n$ value exceeding 0.12 (extrapolated value). Namely, the $\Delta n$ value is too large to set the $\Delta n \cdot d$ value to 0.5. Accordingly it is required to deveolp a liquid crystal compound which has a high N-I transition temperature and yet a low $\Delta n$ value in order to set the $\Delta n \cdot d$ value to 0.5.

SUMMARY OF THE INVENTION

It is an object of the present invention to provide a nematic liquid crystal compound which has a high N-I transition temperature and yet a low $\Delta n$ value.

In order to achieve the above-mentioned object, the present invention provides a compound represented by the following general formula:

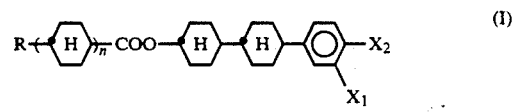

wherein R represents a straight-chain alkyl group having 1 to 9 carbon atoms; $X_1$ represents a H or F atom; $X_2$ represents a F atom, a straight-chain alkyl group or a straight-chain alkoxyl group having 1 to 9 carbon atoms; n is 0 or 1; and each

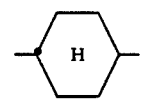

represents a trans(equatorial-equatorial)-cyclohexane ring.

DETAILED DESCRIPTION OF THE INVENTION

The compound of the formula (I) according to the present invention may be prepared by the following method.

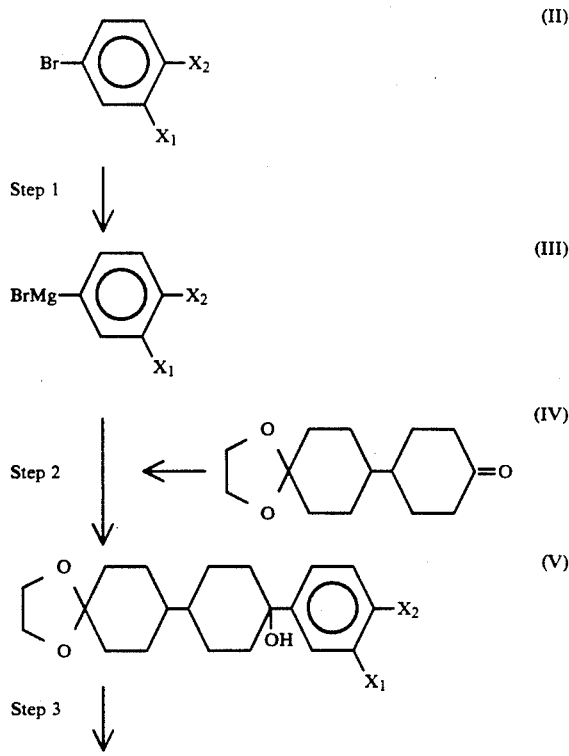

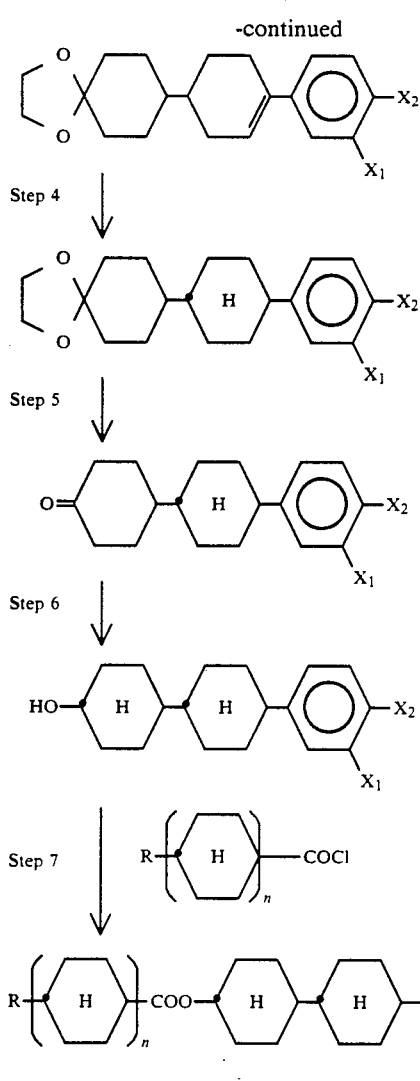

wherein n, R, X₁ and X₂ are each as defined above.

Step 1

A compound of the formula (II) is reacted with a metallic magnesium powder in an ether solvent such as absolute tetrahydrofuran (THF) at 20 to 30 °C. for 1 to 2 hours to thereby give a compound of the formula (III).

Step 2

To a solution of the compound of the formula (III), is added a solution of a compound of the formula (IV) in absolute THF at 5° C. to 20 °C. After reacting at 10° C. to 30° C. for 30 minutes, the reaction mixture is decomposed with a saturated aqueous solution of ammonium chloride to thereby give a compound of the formula (V).

Step 3

The compound of the formula (V) is allowed to react in an inert solvent insoluble in water such as toluene in the presence of an acidic catalyst such as p-toluenesulfonic acid at the reflux temperature for 2 to 8 hours. After cooling the reaction mixture, the solvent phase is successively washed with a saturated aqueous solution of sodium carbonate and a saturated aqueous solution of common salt and dried. Then the solvent is distilled off and the residual crude product is recrystallized from an alcohol solvent such as ethanol. Thus a compound of the formula (VI) is obtained.

Step 4

The compound of the formula (VI) is catalytically reduced in an alcohol solvent such as ethanol in the presence of a hydrogenation catalyst such as Raney nickel under a hydrogen pressure of 3 kg/cm² or below at room temperature for 6 to 20 hours. Thus a compound of the formula (VII) is obtained.

Step 5

The compound of the formula (VII) is reacted with an acidic aqueous solution such as dilute sulfuric acid in an inert solvent such as toluene at the reflux temperature for 4 hours. After cooling the reaction mixture, the organic solvent phase is washed with water and dried. Then the solvent is distilled off from the solution and the residual crude product is purified by recrystallizing from a solvent mixture comprising n-hexane and ethyl acetate. Thus a compound of the formula (VIII) is obtained.

Step 6

The compound of the formula (VIII) is reacted with a reducing agent such as sodium borohydride in an organic aqueous solvent such as THF or ethanol at room temperature for 5 hours. After the completion of the reaction, the reaction mixture is poured into a 1 N aqueous solution of sodium hydroxide. Then the obtained mixture is extracted with toluene, washed with water and dried. After the organic solvent is distilled off, the residual crude product is purified by recrystallization from a solvent mixture comprising n-hexane and ethanol. Thus a compound of the formula (IX) is obtained.

Step 7

The compound of the formula (IX) is reacted with a compound of the formula (X) in an inert solvent such as toluene in the presence of a base such as pyridine. After the completion of the reaction, the toluene phase is washed with water and dried and the toluene is distilled off therefrom. The residual crude product is purified by recrystallization from ethanol. Thus a compound of the formula (I) is obtained.

The following Table 1 shows the phase transition temperatures of typical examples of the compound of the formula (I) thus obtained according to the present invention.

TABLE 1

| No. | R | n | X₁ | X₂ | Transition Temperature (°C.) |
|---|---|---|---|---|---|
| 1 | CH₃— | 0 | H— | C₂H₅— | 79 (C→S) 109 (S⇌N) 157 (N⇌I) |
| 2 | CH₃— | 0 | H— | F— | 110 (C→N) 169 (N⇌I) |
| 3 | n-C₃H₇— | 0 | H— | C₂H₅— | 95 (C→S) |

TABLE 1-continued

R⟨H⟩ₙ—COO—⟨H⟩—⟨H⟩—⟨O⟩—X₂ / X₁

| No. | R | n | X₁ | X₂ | Transition Temperature (°C.) |
|---|---|---|---|---|---|
| | | | | | 135 (S⇌N) |
| | | | | | 171 (N⇌I) |
| 4 | n-C₃H₇— | 0 | H— | n-C₃H₇— | 168 (C→N) |
| | | | | | 186 (N⇌I) |
| 5 | n-C₃H₇— | 0 | H— | F— | 58 (C→N) |
| | | | | | 159 (N⇌I) |
| 6 | n-C₃H₇— | 0 | F— | F— | 60 (C→N) |
| | | | | | 130 (N⇌I) |
| 7 | n-C₄H₉— | 0 | H— | F— | 38 (C→N) |
| | | | | | 141 (N⇌I) |
| 8 | n-C₃H₇— | 0 | H— | CH₃O— | 132 (C→S) |
| | | | | | 151 (S⇌N) |
| | | | | | 191 (N⇌I) |
| 9 | n-C₃H₇— | 0 | F— | C₂H₅— | 91 (C→N) |
| | | | | | 142 (N⇌I) |
| 10 | n-C₃H₇— | 1 | H— | F— | 195 (C→S) |
| | | | | | 200 (S⇌N) |
| | | | | | 298 (N⇌I) |
| 11 | n-C₃H₇— | 1 | H— | C₂H₅— | 240 (C→S) |
| | | | | | 275 (S⇌N) |
| | | | | | 320 (N⇌I) |
| 12 | n-C₃H₇— | 1 | F— | F— | 154 (C→N) |
| | | | | | 272 (N⇌I) |

Note:
C represents a crystalline phase. S represents a smectic phase. N represents a nematic phase and I represents an isotropic liquid phase.

The compound of the formula (I) of the present invention is a nematic liquid crystal compound having a weak positive dielectric anisotropy. Therefore it may be mixed with, for example, other nematic liquid crystal compound(s) having a negative dielectric anisotropy and applied for a dynamic scattering mode display cell material. Alternately, it may be mixed with other nematic liquid crystal compound(s) having a positive or negative dielectric anisotropy and applied for a field effect mode display cell material.

Preferable examples of the liquid crystal compounds to be mixed with the compound of the formula (I) include 4-substituted benzoic acid 4'-substituted phenyl esters, 4-substituted cyclohexanecarboxylic acid 4'-substituted phenyl esters, 4-substituted cyclohexanecarboxylic acid 4'-substituted biphenyl esters, 4-(4-substituted cyclohexanecarbonyloxy)benzoic acid 4,-substituted phenyl esters, 4-(4-substituted cyclohexyl)benzoic acid 4'-substituted phenyl esters, 4-(4-substituted cyclohexyl)benzoic acid 4'-substituted cyclohexyl esters, 4-substituted 4'-substituted biphenyls, 4-substituted phenyl-4'-substituted cyclohexanes, 4-substituted 4''-substituted terphenyls, 4-substituted biphenyl 4'-substituted cyclohexanes and 2-(4-substituted phenyl)-5-substituted pyrimidines.

Table 2 shows the N-I transition temperature and the optical anisotropy (Δn) of each liquid crystal mixture comprising 80% by weight of mixed liquid crystals (A), which are widely used as matrix liquid crystals today, and 20% by weight of the compound of the formula (I) No. 1, No. 2, No. 3, No. 4, No. 5, No. 6, No. 7, No. 8 or No. 9. Furthermore those of the mixed liquid crystals (A) are shown in Table 2 for comparison.

Table 3 shows the N-I transition temperature and Δn of each mixed liquid crystals comprising 90% by weight of the mixed liquid crystals (A) and 10% by weight of the compound (I) No. 10, No. 11 or No. 12.

The mixed liquid crystals (A) comprises:

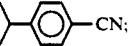
20% by weight of n-C₃H₇—⟨H⟩—⟨O⟩—CN;

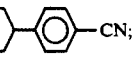
16% by weight of n-C₅H₁₁—⟨H⟩—⟨O⟩—CN;

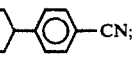
16% by weight of n-C₇H₁₅—⟨H⟩—⟨O⟩—CN;

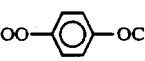
8% by weight of n-C₃H₇—⟨H⟩—COO—⟨O⟩—OC₂H₅;

8% by weight of n-C₃H₇—⟨H⟩—COO—⟨O⟩—O-n-C₄H₉;

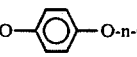
8% by weight of n-C₄H₉—⟨H⟩—COO—⟨O⟩—OCH₃;

8% by weight of n-C₄H₉—⟨H⟩—COO—⟨O⟩—OC₂H₅;

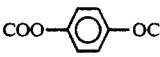
8% by weight of n-C₅H₁₁—⟨H⟩—COO—⟨O⟩—OCH₃; and

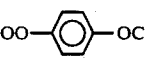
8% by weight of n-C₅H₁₁—⟨H⟩—COO—⟨O⟩—OC₂H₅.

TABLE 2

| Liquid crystal mixture | N-I point (°C.) | Δn |
|---|---|---|
| (A) | 54.0 | 0.0917 |
| (A) + No. 1 | 64.9 | 0.0945 |
| (A) + No. 2 | 66.7 | 0.0940 |
| (A) + No. 3 | 67.8 | 0.0936 |
| (A) + No. 4 | 69.0 | 0.0956 |
| (A) + No. 5 | 67.9 | 0.0934 |
| (A) + No. 6 | 62.7 | 0.0910 |
| (A) + No. 7 | 65.4 | 0.0917 |
| (A) + No. 8 | 69.9 | 0.0962 |
| (A) + No. 9 | 65.5 | 0.0926 |

TABLE 3

| Liquid crystal mixture | N-I point (°C.) | Δn |
|---|---|---|
| (A) | 54.0 | 0.0917 |
| (A) + No. 10 | 72.8 | 0.0947 |
| (A) + No. 11 | 73.8 | 0.0953 |
| (A) + No. 12 | 71.3 | 0.0924 |

Tables 2 and 3 indicate that the compound of the formula (I) increases the N-I point of the mixed liquid crystals (A) to a practically satisfactory level but scarcely increases or even lowers the Δn thereof, which suggest that this compound is highly useful.

For comparison, the phase transition temperatures of a compound having a similar structure to that of the compound No. 4, represented by the following formula:

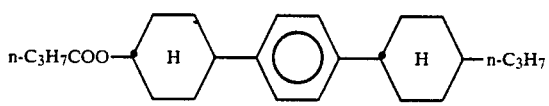

are determined. As a result, it shows phase transition temeratures of 171° C. (C→S) and 168° C. (S⇌I), which does not have a nematic phase. Namely, this compound is unsuitable for the purpose of the present invention.

The present invention is now illustrated in greater detail by reference to the following non-limiting examples. Unless otherwise indicated, all percent and ratio are by weight.

EXAMPLE 1

29.2 g (0.167 mol) of p-bromofluorobenzene was dissolved in 120 ml of absolute tetrahydrofuran which will be called THF hereinafter. The solution thus obtained was added dropwise to 4.46 g (0.184 gram atom) of metallic magnesium under stirring at 20° C. to 30° C. The resulting mixture was further reacted at room temperature (25° C.) for 2 hours. Thus a compound of the formula:

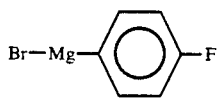

was obtained.

Next, 30.5 g (0.128 mol) of a compound of the formula:

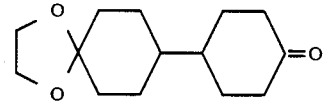

was dissolved in 150 ml of absolute THF. The solution thus obtained was added dropwise to the Grignard reagent prepared above under stirring at 10° C. to 15° C. The mixture was further reacted at room temperature for 30 minutes. After the completion of the reaction, the reaction mixture was added to a saturated aqueous solution of ammonium chloride. Then the reaction product was extracted with toluene and the extract was washed with water and dried. After evaporation of the solvent, 39.8 g of a crude product containing the following compound was obtained:

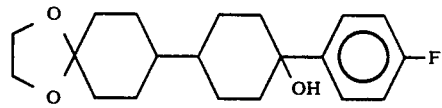

This crude product was dissolved in 250 ml of toluene. To the obtained solution, was added 0.24 g (0.0013 mol) of p-toluenesulfonic acid monohydride. Then the resulting mixture was dehydrated under stirring at the reflux temperature for 2 hours. After cooling the reaction mixture, the toluene phase was successively washed with a saturated aqueous solution of sodium hydrogencarbonate and a saturated aqueous solution of common salt and dried. After evaporation of the toluene, the residual reaction product was purified by recrystallization from ethanol. Thus 27.2 g (0.0858 mol) of the following compound was obtained.

Yield: 67.0%

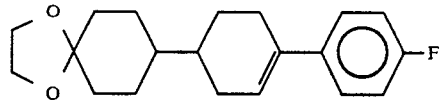

Next, this compound was dissolved in 3000 ml of ethanol. To the resulting solution, was added a catalytic amount of Raney nickel. Then it was hydrogenated under elevated pressure (3.0 kg/cm² or below) at room temperature under stirring. After the completion of the reaction, the catalyst was filtered off from the reaction mixture and the ethanol was evaporated from the filtrate. The crude reaction product thus obtained was purified by recrystallization from ethanol. Thus 11.8 g (0.0370 mol) of the following compound was obtained.

Yield: 43.1%.

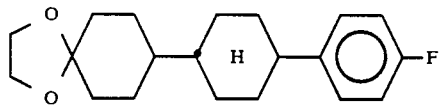

This compound was dissolved in 70 ml of toluene and 50 ml of 10% sulfuric acid was added thereto. Then the obtained mixture was allowed to react at the reflux temperature under stirring for 4 hours. After the completion of the reaction, the reaction mixture was cooled and the toluene phase was washed with water and dried. Next, the toluene was evaporated and the residual crude product was purified by recrystallization from a solvent mixture (ethyl acetate:n-hexane=1:4 by volume). Thus 9.60 g (0.0350 mol) of the following compound was obtained.

Yield: 94.7%.

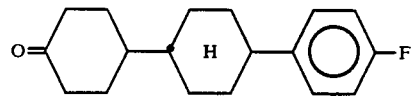

Next, this compound was dissolved in a mixture comprising 50 ml of THF and 20 ml of ethanol. To the obtained solution, was slowly added 0.662 g (0.0175 mol) of sodium borohydride under stirring. The obtained mixture was allowed to react at room temperature for 5 hours. After the completion of the reaction, the reaction mixture was poured into a 1 N aqueous solution of sodium hydroxide and extracted with toluene. The toluene phase was washed with water and dried and the toluene was evaporated. The residual crude product was purified by recrystallization from a solvent mixture (n-hexane:ethanol=5:1 by volume). Thus 5.57 g (0.0202 mol) of the following compound was obtained.

Yield: 57.7%.

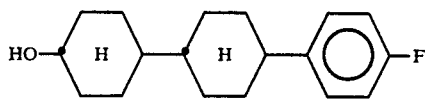

Next, this compound was dissolved in 50 ml of toluene and 2.37 g (0.0300 mol) of pyridine was added thereto. The obtained mixture was refluxed under stirring and further 2.15 g (0.0202 mol) of n-C$_3$H$_7$COCl was added thereto dropwise. After the completion of the addition, the resulting mixture was reacted for 1 hour and cooled. Then the toluene phase was washed with water and dried and the toluene was evaporated. The crude reaction product thus obtained was purified by recrystallization from ethanol. Thus 6.01 g (0.0174 mol) of the following compound was obtained.

Yield: 86.1%.

n-C$_3$H$_7$COO—(H)—(H)—(⌬)—F

Phase transition temperature: 58° C. (CN), 159° C. (NI).

EXAMPLE 2

The procedure of Example 1 was repeated except that the p-bromofluorobenzene was substituted with 30.9 g of p-bromoethylbenzene and the n-C$_3$H$_7$COCl was replaced by acetic chloride.

Thus the following compound was obtained.

CH$_3$COO—(H)—(H)—(⌬)—C$_2$H$_5$

Yield: 14.1%.
Phase transition temperature: 79° C. (C→S), 109° C. (S⇌N), 157° C. (N⇌I).

EXAMPLE 3

The procedure of Example 1 was repeated except that the n-C$_3$H$_7$COCl was replaced by acetic chloride. Thus the following compound was obtained.

CH$_3$COO—(H)—(H)—(⌬)—F

Yield: 15.3%.
Phase transition temperature: 110° C. (C→N), 169° C. (N⇌).

EXAMPLE 4

The procedure of Example 1 was repeated except that the p-bromofluorobenzene was replaced by 30.9 g of p-bromoethyl-benzene. Thus the following compound was obtained.

n-C$_3$H$_7$COO—(H)—(H)—(⌬)—C$_2$H$_5$

Yield: 15.7%.
Phase transition temperature: 95° C. (C→S), 135° C. (S⇌N), 171° C. (N⇌I).

EXAMPLE 5

The procedure of Example 1 was repeated except that the p-bromofluorobenzene was replaced by 33.2 g of p-bromo-n-propylbenzene. Thus the following compound was obtained.

n-C$_3$H$_7$COO—(H)—(H)—(⌬)—n-C$_3$H$_7$

Yield: 16.2%.
Phase transition temperature: 168° C. (C→N), 186° C. (N⇌I).

EXAMPLE 6

The procedure of Example 1 was repeated except that the p-bromofluorobenzene was replaced by 32.2 g of 3,4-difluorobromobenzene. Thus the following compound was obtained.

n-C$_3$H$_7$COO—(H)—(H)—(⌬)(-F)(-F)

Yield: 14.3%.
Phase transition temperature: 60° C. (C→N), 130° C. (N⇌I).

EXAMPLE 7

The procedure of Example 1 was repeated except that the n-C$_3$H$_7$COCl was replaced by n-C$_4$H$_9$COCl. Thus the following compound was obtained.

n-C$_4$H$_9$COO—(H)—(H)—(⌬)—F

Yield: 15.7%.
Phase transition temperature: 38° C. (C→N), 141° C. (N⇌I).

EXAMPLE 8

The procedure of Example 1 was repeated except that the p-bromofluorobenzene was replaced by 31.2 g of p-bromomethoxybenzene. Thus the following compound was obtained.

n-C$_3$H$_7$COO—(H)—(H)—(⌬)—OCH$_3$

Yield: 14.2%.
Phase transition temperature: 132° C. (C→S), 151° C. (S⇌N), 191° C (N⇌I).

EXAMPLE 9

The procedure of Example 1 was repeated except that the p-bromofluorobenzene was replaced by 33.9 of 3-fluoro-4-ethylbromobenzene. Thus the following compound was obtained.

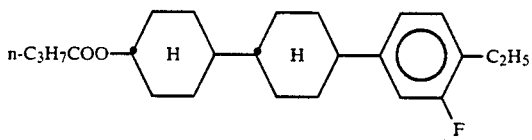

Yield: 13.7%.

Phase transition temperature: 91° C. (C→N), 142° C. (N⇌I).

EXAMPLE 10

The procedure of Example 1 was repeated except that the n-C₃H₇COCl was replaced by 3.8 g of

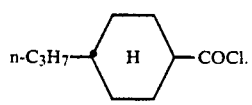

Thus 7.36 g (0.0168 mol) of the following compound was obtained.

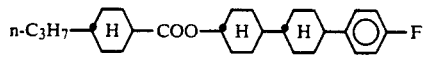

Phase transition temperature: 195° C. (C→S), 200° C. (S⇌N), 298° C. (N=I).

EXAMPLE 11

The procedure of Example 1 was repeated except that the p-bromofluorobenzene was replaced by 30.9 g of p-bromoethylbenzene and the n-C₃H₇COCl was replaced by

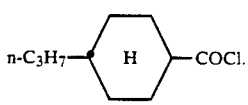

Thus the following compound was obtained.

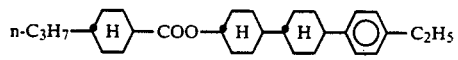

Yield: 15.0%.

Phase transition temperature: 240° C. (C→S), 275° C. (S⇌N), 320° C. (N⇌I).

EXAMPLE 12

The procedure of Example 1 was repeated except that the p-bromofluorobenzene was replaced by 32.2 g of 3,4-difluorobromobenzene and the n-C₃H₇COCl was replaced by

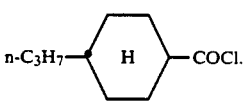

Thus the following compound was obtained.

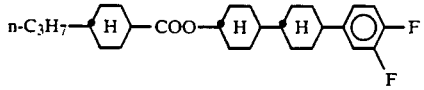

Yield: 14.5%.

Phase transition temperature: 154° C. (C→N), 272° C. (N⇌I).

The compound (I) of the present invention is a nematic liquid crystal compuond which has a high N-I point and yet a low Δn value. When mixed with nematic mixed liquid crystals widely employed as matrix liquid crystals today, it exerts excellent effects of increasing the N-I point of the mixed liquid crystals while scarcely increasing the Δn value of the same.

Namely, the compund (I) of the present invention is highly useful as a material for producing a liquid crystal dispaly cell which is excellent in visual properties and hightemperature driving properties.

While the invention has been described in detail and with reference to specific embodiments thereof, it will be apparent to one skilled in the art that various changes and modifications can be made therein without departing from the spirit and scope thereof.

What is claimed is:

1. A compound represented by the following formula:

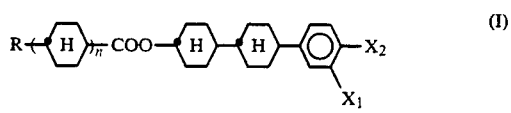

wherein R represents a straight-chain alkyl group having 1 to 9 carbon atoms; $X_2$ represents a F atom, a straight-chain alkyl group or a straight-chain alkoxyl group having 1 to 9 carbon atoms; n is 0 and each

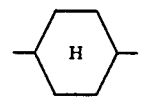

represents a trans(equatorial-equatorial)cyclohexane ring, and wherein $X_1$ is a hydrogen atom.

2. A compound as claimed in claim 1, wherein $X_2$ is a straight-chain alkyl group having 1 to 9 carbon atoms.

3. A compound as claimed in claim 1, wherein $x_2$ is a straight-chain alkoxyl group having 1 to 9 carbon atoms.

4. A compound as claimed in claim 1, wherein $x_2$ is a fluorine atom.

5. A nematic liquid crystal composition containing a compound as claimed in claim 1.

6. A compound represented by the following formula:

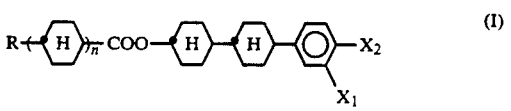

wherein R represents a straight-chain alkyl group having 1 to 9 carbon atoms; $X_1$ represents a H or F atom; $X_2$ represents a F atom, a straight-chain alkyl group or a straight-chain alkoxyl group having 1 to 9 carbon atoms; n is 1; and each

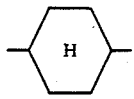

represents a trans(equatorial-equatorial)cyclohexane ring.

7. A compound as claimed in claim 6, wherein $X_1$ is a hydrogen atom.

8. A compound as claimed in claim 7, wherein $X_2$ is a straight-chain alkyl group having 1 to 9 carbon atoms.

9. A compound as claimed in claim 7, wherein $X_2$ is a fluorine atom.

10. A compound as claimed in claim 6, wherein $X_1$ is a fluorine atom.

11. A compound as claimed in claim 10, wherein $x_2$ is a fluorine atom.

12. A nematic liquid crystal composition containing a compound as claimed in claim 6.

* * * * *